(12) United States Patent
O'Day et al.

(10) Patent No.: US 7,804,210 B2
(45) Date of Patent: Sep. 28, 2010

(54) POSITION MEASUREMENT USING MAGNETIC FIELDS

(75) Inventors: Richard F. O'Day, Westborough, MA (US); Dariusz Antoni Bushko, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 12/055,283

(22) Filed: Mar. 25, 2008

(65) Prior Publication Data
US 2009/0243402 A1 Oct. 1, 2009

(51) Int. Cl.
*H02K 23/66* (2006.01)
*H02K 41/00* (2006.01)

(52) U.S. Cl. ............ 310/68 B; 310/12.19; 310/12.01

(58) Field of Classification Search ............ 310/12–14, 310/68 B
See application file for complete search history.

(56) References Cited

U.S. PATENT DOCUMENTS

| | | | |
|---|---|---|---|
| 4,981,309 A | | 1/1991 | Froeschle et al. |
| 5,130,583 A | * | 7/1992 | Andoh ......................... 310/12 |
| 5,225,725 A | * | 7/1993 | Shiraki et al. ................. 310/12 |
| 5,341,097 A | * | 8/1994 | Wu .......................... 324/207.2 |
| 5,351,003 A | | 9/1994 | Bauer et al. |
| 5,574,445 A | | 11/1996 | Maresca et al. |
| 5,691,582 A | * | 11/1997 | Lucas et al. ................... 310/14 |
| 5,796,186 A | * | 8/1998 | Nanba et al. .................. 310/14 |
| 5,920,248 A | | 7/1999 | Travostino |
| 6,100,681 A | | 8/2000 | Tsuruta |
| 6,573,623 B2 | * | 6/2003 | Tsuboi et al. ............. 310/12.19 |
| 6,707,293 B2 | | 3/2004 | Wan et al. |
| 2001/0054851 A1 | * | 12/2001 | Tsuboi et al. ................. 310/12 |
| 2007/0255087 A1 | * | 11/2007 | Minai .......................... 600/12 |
| 2008/0246466 A1 | | 10/2008 | Jajtic et al. |
| 2009/0128930 A1 | | 5/2009 | Fujioka et al. |

FOREIGN PATENT DOCUMENTS

| | | |
|---|---|---|
| DE | 4428333 A1 | 2/1996 |
| DE | 200 09 814 U1 | 10/2001 |
| DE | 102004045934 A1 | 4/2006 |
| EP | 0726448 A1 | 8/1996 |
| WO | 2004015375 A1 | 2/2004 |

OTHER PUBLICATIONS

International Search Report and Written Opinion dated Dec. 23, 2009 for PCT/US2009/036898.
International Search Report and Written Opinion dated Nov. 26, 2009 for PCT/US2009/036915.
Sentron: "2SA-10 Integrated 2-Axis Hall Sensor" Internet Citation [Online], http://www.sentron.ch/datasheets/2SA-10.pdf> [retrived Aug. 24, 2009] p. 8.
Invitation to Pay Additional Fees and, Where Applicable, Protest Fee dated Sep. 3, 2009 for PCT/US2009/036898.
Invitation to Pay Additional Fees and, Where Applicable, Protest Fee dated Sep. 7, 2009 for PCT/US2009/036915.

* cited by examiner

*Primary Examiner*—Quyen Leung
*Assistant Examiner*—Leda Pham

(57) ABSTRACT

A position sensing system for positioning a linear motor that includes a stator and an armature having magnets, the armature moving relative to the stator along a path. A sensor determines a position of the armature based on measurements of a magnetic field generated by the magnets of the armature.

23 Claims, 17 Drawing Sheets

POSITION MEASUREMENT USING MAGNETIC FIELDS

RELATED APPLICATIONS

This application is related to U.S. patent application Ser. No. 12/055,280, titled "POSITION MEASUREMENT USING MAGNETIC FIELDS", filed concurrently with this application. The contents of the above application are incorporated herein by reference.

BACKGROUND

This disclosure relates to position measurement using magnetic fields.

Linear motors can be used to control the positions and movements of objects. In some examples, magnetic sensor arrays can be used to read patterns of magnetic scales mounted on an armature to determine the position of the armature relative to a stator of the motor. The sensors can be digital sensors (such as Hall effect switches), analog sensors (such as magneto-resistive or giant magneto-resistive sensors), or a combination of both.

SUMMARY

This document describes a low-cost non-contact high-resolution long-stroke absolute position sensor that can operate over a wide range of temperature. The position sensor measures the position of a linear motor armature so that a control system can properly perform motor commutation (electrically driving the appropriate motor windings) and control a higher-level system in which the motor is used.

In one aspect, in general, a linear motor includes a stator and an armature, the armature moving relative to the stator along a path, the armature including magnets; and a sensor determines a position of the armature based on measurements of a magnetic field generated by the magnets of the armature.

Implementations can include one or more of the following features. The sensor can detect a magnetic field of one of the magnets of the armature. The one of the magnets can be at an end of the armature. The sensor can determine a direction of the magnetic field. The sensor can include a first magnetic sensor detecting a first end of the armature, and a second magnetic sensor detecting a second end of the armature. The sensor can compensate variations of the magnetic field strength. The variations of the magnetic field strength can be caused by a factor chosen from the group consisting of temperature changes, distance, magnetic field. The sensor can compensate the magnetic field strength by using ratio of a first measurement of the magnetic field in a first direction and a second measurement of the magnetic field in a second direction. The sensor can measure a first measurement of the magnetic field in a first direction and a second measurement of the magnetic field in a second direction. The sensor can include a magnetic sensor to detect the magnetic field of the armature magnets, the magnetic sensor being spaced apart from the stator. The sensor can measure the first and second measurements by measuring amplitudes of the magnetic field in the first and second directions at a location. The first and second directions can include a first direction perpendicular to the path and a second direction perpendicular to the path. A storage device can be provided to store information about a correlation between a direction of the magnetic field and a position of the moving member along the path. A module can be provided to calculate a correlation between a direction of the magnetic field and a position of the moving member along the path.

In another aspect, in general, a member movable along a path includes an elongated magnet extending along the path, the magnetic field orientation of the elongated magnet being at an angle with respect to the path; and a sensor determines a position of the member along the path based on a measurement of a magnetic field generated by the elongated magnet.

Implementations can include one or more of the following features. The magnetic field orientation of the elongated magnet being at an angle with respect to the path can be achieved by physically placing the elongated magnet along a direction at the same angle with respect to the path, or by printing the magnetic field orientation of the elongated magnet along a direction at the same angle with respect to the path. The elongated magnet can include a first portion and a second portion, the first portion having a magnetic north-to-south direction that is different from a magnetic north-to-south direction of the second portion. Both the first and second portions can extend parallel to the first direction. The first and second portions can have north-to-south axes that are perpendicular to the first direction. The sensor can determine a direction of the magnetic field generated by the elongated magnet. A storage device can be provided to store information about a correlation between a direction of the magnetic field and a position of the member. A module can be provided to calculate a correlation between a direction of the magnetic field and a position of the member. The sensor can determine an absolute position of the member along the path based on the measurement of the magnetic field. The member can include an armature of a motor. The elongated magnet can include a strip magnet.

In another aspect, in general, a member movable along a path changes a distribution of a magnetic field of a magnet as the member moves relative to the magnet along the path; and a sensor determines a position of the member on the path based on a measurement of an orientation of the magnetic field.

Implementations can include one or more of the following features. The member can include a ferromagnetic element that changes the distribution of the magnetic field as the member moves along the path. The ferromagnetic element can include a steel element. The ferromagnetic element can have a cross section that varies as the member moves along the path, the cross section being along a plane perpendicular to the path. The member can include an armature of a motor. The magnet can be fixed relative to a stator of the motor.

In another aspect, in general, an active suspension system includes a linear motor having a stator and an armature, the armature moving relative to the stator along a path, the armature including magnets, a sensor to determine a position of the armature based on measurements of a magnetic field generated by the magnets of the armature, and a controller to control the linear motor based on the position of the armature.

Implementations can include one or more of the following features. The armature can be coupled to a seat or a wheel.

In another aspect, in general, an active suspension system includes a member movable along a path, the member including an elongated magnet extending along the path, the magnetic field orientation of the elongated magnet being at an angle with respect to the path. The system includes a sensor to determine a position of the member along the path based on a measurement of a magnetic field generated by the elongated magnet, and a controller to control a movement of member based on the position of the member.

Implementations can include one or more of the following features. The armature can be coupled to a seat or a wheel.

In another aspect, in general, an active suspension system includes a magnet and a member movable along a path, the member changing a distribution of a magnetic field of the magnet as the member moves relative to the magnet along the path. The system includes a sensor to determine a position of the member on the path based on a measurement of an orientation of the magnetic field, and a controller to control a movement of member based on the position of the member.

Implementations can include one or more of the following features. The member can be coupled to a seat or a wheel.

In another aspect, in general, a magnetic field from magnets of an armature of a linear motor moves the armature relative to a stator; and a position of the armature is determined based on measurements of the magnetic field generated by the magnets of the armature.

Implementations can include one or more of the following features. A magnetic field of one of the magnets at an end of the armature can be detected. A direction of the magnetic field can be determined. Determining the direction of the magnetic field can include determining a ratio of a first measurement of the magnetic field in a first direction and a second measurement of the magnetic field in a second direction. The first and second directions can include a first direction perpendicular to the path and a second direction perpendicular to the path. The method can include positioning a magnetic sensor at a distance from the stator and using the magnetic sensor to detect the magnetic field of the armature magnets, the distance selected to reduce an interference from a magnetic field generated by the stator. Information about a correlation between a direction of the magnetic field and a position of the moving member along the path can be stored in a storage. A correlation between a direction of the magnetic field and a position of the moving member along the path can be determined.

In another aspect, in general, a member is moved along a path, the member including an elongated magnet extending along the path, the magnetic field orientation of the elongated magnet being at an angle with respect to the path; and a position of the member along the path is determined based on a measurement of a magnetic field generated by the elongated magnet.

Implementations can include one or more of the following features. The elongated magnet is physically placed along a direction at the angle with respect to the path. A direction of the magnetic field generated by the elongated magnet is determined. Information about a correlation between a direction of the magnetic field and a position of the moving member along the path can be stored in a storage. A correlation between a direction of the magnetic field and a position of the moving member along the path can be determined. An absolute position of the member along the path can be determined based on the measurement of the magnetic field. Moving a member along a path can include moving an armature of a motor along the path.

In another aspect, in general, a member is moved along a path and a distribution of a magnetic field of a magnet is changed as the member moves relative to the magnet along the path; and a position of the member on the path is determined based on a measurement of an orientation of the magnetic field.

Implementations can include one or more of the following features. Moving a member along a path can include moving a ferromagnetic element that changes the distribution of the magnetic field as the member moves along the path. Moving a member along a path can include moving a steel element that changes the distribution of the magnetic field as the member moves along the path. Moving a member along a path can include moving a ferromagnetic element having a cross section that varies as the member moves along the path, the cross section being along a plane perpendicular to the path. Moving a member along a path can include moving an armature of a motor along the path. The magnet can be maintained at a fixed position relative to a stator of the motor.

These and other aspects and features, and combinations of them, may be expressed as methods, apparatus, systems, means for performing functions, program products, and in other ways.

These aspects and features may have one or more of the following advantages. The position sensor can be simple and low-cost, and can be assembled with low-precision requirements. A small number of magnetic field direction sensors and magnetic field sources can be used for each position sensor.

DETAILED DESCRIPTION

Figure 1:
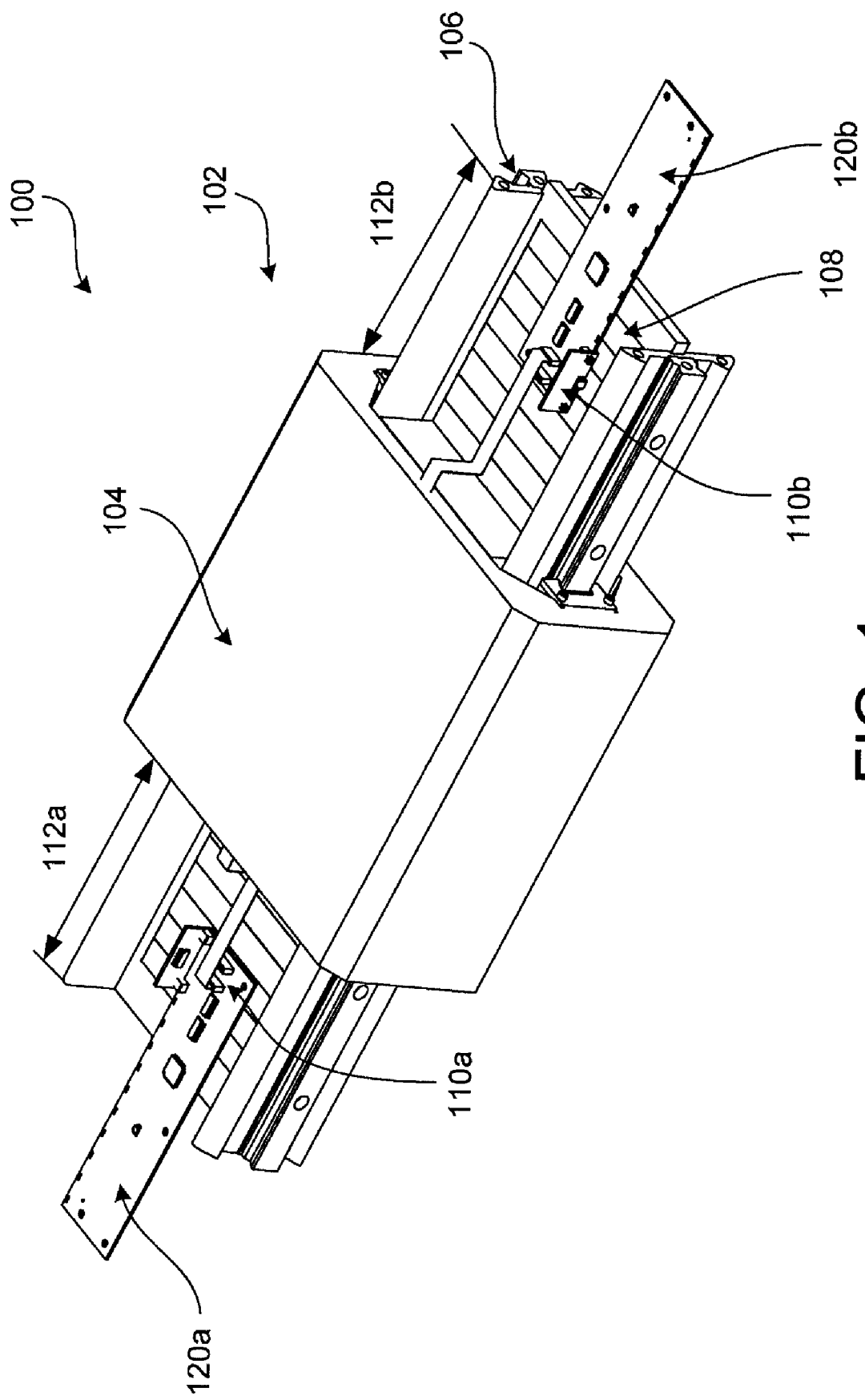
FIG. 1 is a schematic view of a positioning system.

Referring to FIG. 1, in some implementations, a positioning system 100 uses a combination of low resolution coarse position sensing and high resolution fine position sensing to determine an accurate position of an armature 106 relative to a stator 104 of a linear motor 102. The fine position sensing can be achieved using position sensor assembly 120a and 120b (collectively referenced as 120). In one example, position sensor assembly 120a and 120b comprise magnetic field direction sensors 110a and 110b (collectively referenced as 110) that provide high-resolution relative position measurements, and a series of Hall effect sensors 122 (see FIG. 2) that provide low resolution coarse position measurements of an end point of the armature 106. The outputs from the field direction sensors 110 and Hall effect sensors 122 are processed by a microcontroller 322 (see FIG. 15) to determine a high-resolution absolute position of the armature 106.

The stator 104 includes wiring or coils for passing a controllable electric current to generate a controllable electromagnetic field. The armature 106 includes a series of magnets (e.g., 108a, 108b, . . . , collectively referenced as 108) for producing a magnetic field that interacts with the electromagnetic field from the stator coils to generate a magnetic force for moving the armature 106. The position and movement of the armature 106 are controlled by an external control system (not shown) that properly applies various electrical currents to the various coils based on various information, for example, a current position of the armature 106. A feature of the positioning system 100 is that the same magnets 108 are used for both force generation (for moving the armature 106) and position measurement. This reduces the cost of the positioning system 100 since it is not necessary to use additional magnets for position sensing.

The positioning system 100 has many applications. For example, the system 100 can be used as part of a suspension system of a vehicle to provide greater comfort to the driver and passengers. The system 100 can help maintain the vehicle body steady while traveling over bumpy roads and keep the vehicle body level during aggressive maneuvers. The positioning system 100 can also be used as part of a driver seat suspension system that keeps the driver seat steady and isolates the driver from vibrations of other parts of the vehicle.

The positioning system 100 shown in FIG. 1 uses a full-stroke linear motor 102, meaning that the armature 106 can extend to either side (112a or 112b) of the stator 104. In some examples, a half-stroke linear motor can be used. In that case, a single magnetic field direction sensor 110a or 110b can be used to determine the position of the armature 106 as it travels half-stroke on one side of the stator 104.

The term "sensor" as used in this document can have various meanings depending on context. For example, a sensor can be a simple sensing device, such as a Hall effect sensor, Hall effect switch, or a magnetic field direction sensor. A sensor can also be one that includes a data processor that processes signals from sensing devices and determines a position of an armature.

Figure 2:
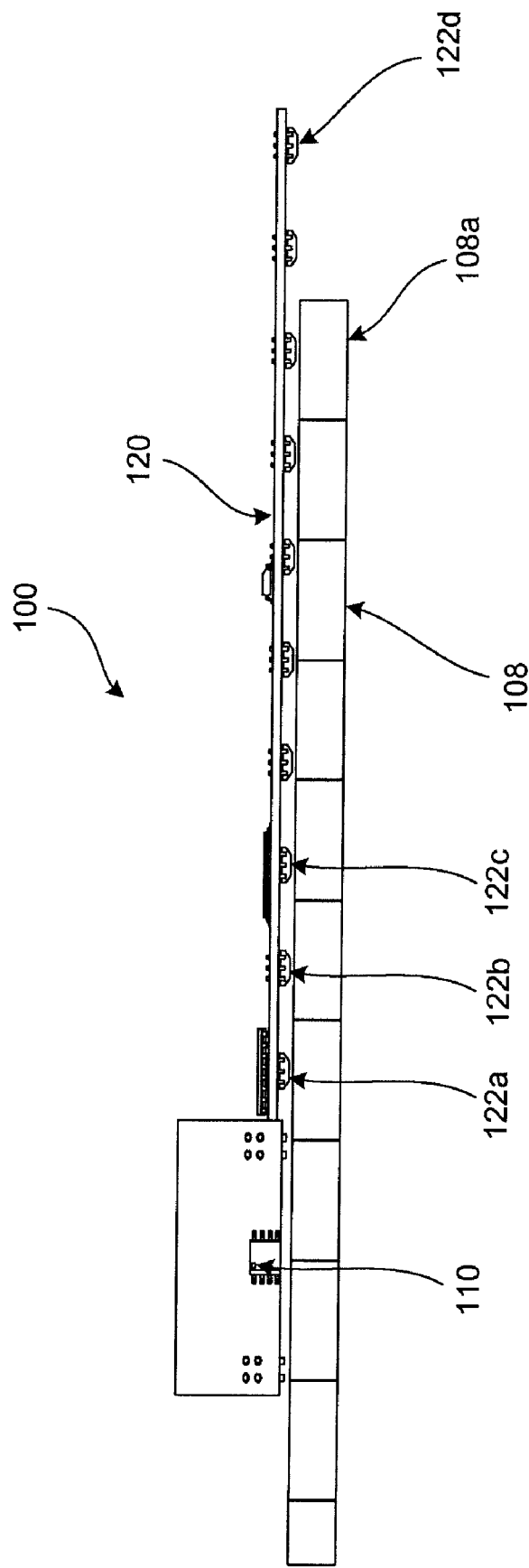
FIG. 2 is a schematic view of sensors used in the positioning system.

Referring to FIG. 2, the position sensor assembly 120 includes a circuit board having several Hall effect sensors 122. In one example, the Hall effect sensors 122 are separated by a nominally uniform distance that is less than that of the armature magnets 108. The circuit board of the position sensor assembly 120 is located at a fixed position relative to the stator 104. The Hall effect sensors 122 measure the magnetic field from the armature magnets 108 and provide a low resolution coarse absolute position of the armature 106 relative to the stator 104, by sensing the approximate absolute location of an end magnet 108a of the armature 106. This allows the positioning system 100 to determine an approximate absolute position of the armature 106 relative to the stator 104. A Hall effect sensor 122d farthest from the stator 104 is positioned so that it can detect the magnetic field of the end magnet 108a when the armature 106 is at its farther-most position. Since the end magnets such as 108a at each end of the armature 106 can travel to locations in the stator 104 where the field direction sensor 110 cannot be placed, Hall effect sensors 122 are placed at both ends of the linear motor 102 so that at least one end magnet can be sensed for any position over the entire stroke of the armature 106. In one example, the range of armature motion (112a and 112b) over which each position sensor assembly (120a and 120b) operate overlap. The range 112a and 112b may or may not be equal.

Other magnetic sensors can also be used to detect the armature magnets 108 for coarse position sensing, such as sensors based upon magnetoresistance.

Figure 3A:
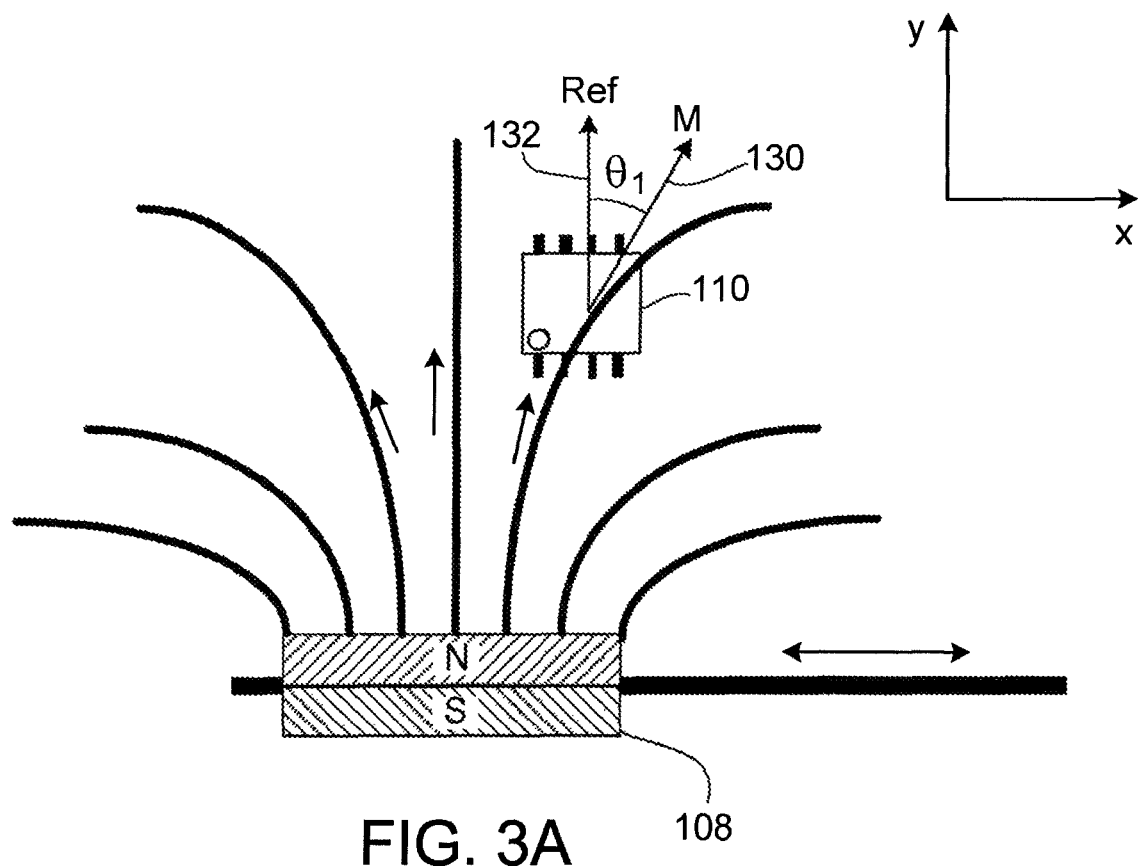
FIG. 3A is a diagram of a magnetic field direction sensor.

Referring to FIG. 3A, the field direction sensor 110 measures an angle $\theta_1$ of a direction 130 of the magnetic field relative to a reference direction 132. An example of the field direction sensor 110 includes 2SA-10 integrated 2-axis Hall effect sensor, available from Sentron AG, Switzerland. The field direction sensor 110 can detect the angle of the direction of the magnetic field by measuring a ratio of two orthogonal components (e.g., x and y components) of the magnetic field. The field direction sensor 110 inherently compensates for variations in the magnetic field strength because the variations tend to be proportional in both components so their ratio remains substantially the same.

Figure 3B:
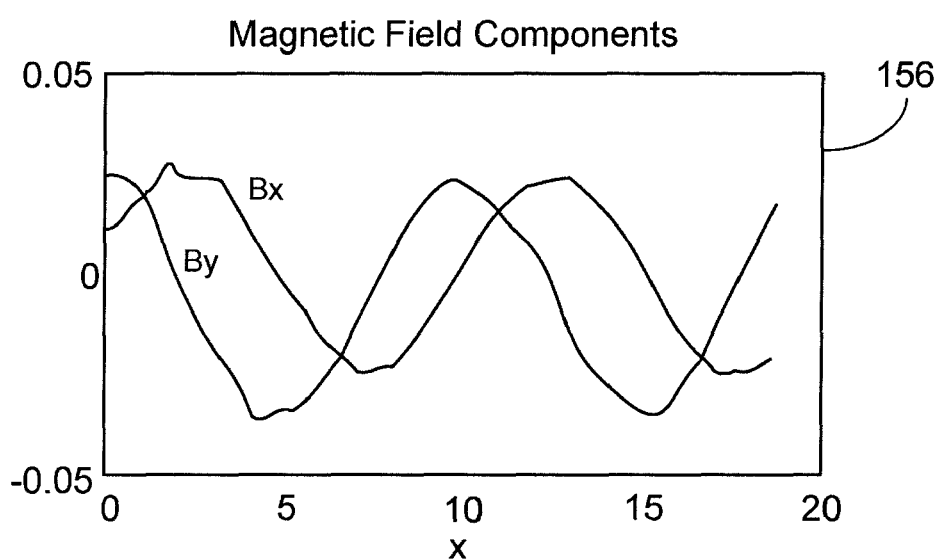
FIG. 3B is a graph showing magnetic field components.

Referring to FIG. 3B, a graph 156 shows the two components of the magnetic field, denoted as Bx and By, detected by the field direction sensor 110. Each of the components Bx and By can vary periodically as the armature magnets 108 move relative to the field direction sensor 110. The horizontal axis represents a distance (millimeter) of the armature movement, and the vertical axis represents the magnitude (Gauss) of the Bx and By components.

Figure 4:
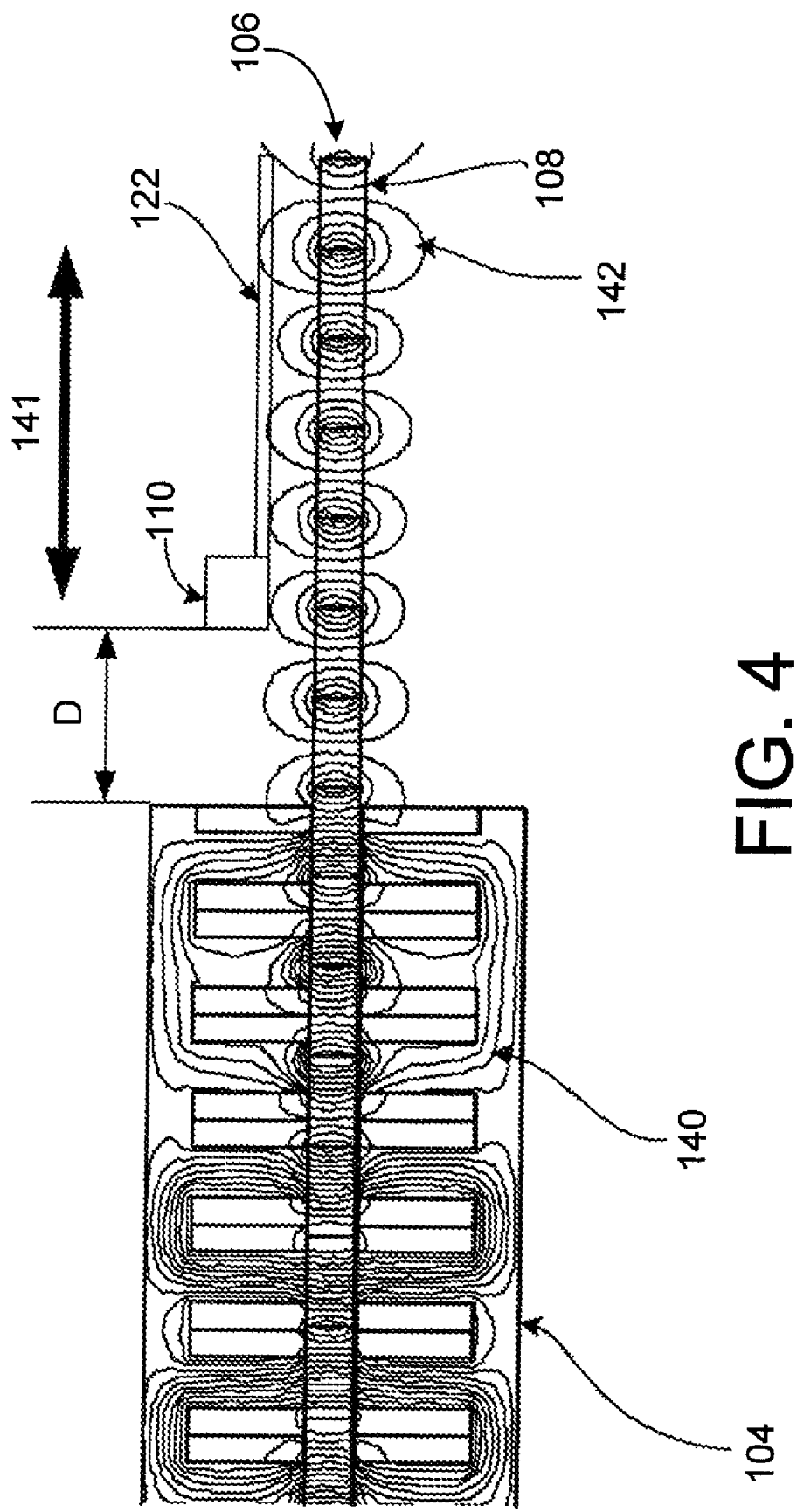
FIG. 4 is a diagram showing a magnetic field distribution in the positioning system.

FIG. 4 shows a distribution of an electromagnetic field 140 generated by the stator coils and a magnetic field 142 generated by the armature magnets 108. The direction of the magnetic field 142 varies periodically along the travel direction 141 of the armature 106. The direction of the magnetic field 142 repeats each time the armature 106 travels a distance spanning two magnets 108. The field direction sensor 110 can determine a position of the armature within a distance of two magnets 108, thereby providing high-resolution relative position sensing. Since the end magnets 108a at each end of the armature can travel to locations in the stator where the field direction sensor 110 cannot be placed, a Hall effect sensor 122 is located at each end of the motor 102, positioned such that there is always a magnet under at least one Hall effect sensor 122 for any position over the entire stroke of the armature 106.

If the field direction sensor 110 has a resolution of x1 degrees, and the pitch of the armature magnets 108 (the pitch refers to the distance between two magnets) is p, the resolution of the fine position sensing is about p*x1/180. In some examples, the field direction sensor 110 can have a resolution of 0.07 degrees, and the armature magnets 108 can have a pitch of 5 mm. This results in a resolution of 5 mm*0.07/180=0.0002 mm.

By combining measurements from the Hall effect sensors 122 (which provide low-resolution absolute position information) and the field direction sensors 110 (which provide high-resolution relative position information), a high-resolution absolute position of the armature 106 relative to the stator 104 can be obtained.

A calibration process is performed after the positioning system 100 is assembled to the motor. During final assembly and testing of the positioning system 100, the outputs of the Hall effect sensors 122 and field direction sensors 110 are recorded for each of a number of positions of the armature 106. The positions of the armature 106 are measured using an external calibrated instrument. The calibrated armature positions and their corresponding outputs from the Hall effect sensors 122 and field direction sensors 110 are stored in a calibrated lookup table 324 (see FIG. 15). Later, when the positioning system 100 is used, measurements obtained from the Hall effect sensors 122 and field direction sensors 110 are compared with the values in the calibrated lookup table 324 to determine the position of the armature 106. Interpolating between the table values can be employed to obtain position values that are not limited by the resolution of the table 324 itself.

The calibrated lookup table 324 allows use of low cost, non-calibrated sensors. Because the lookup table 324 is established near the final stage of the manufacturing process, manufacturing tolerances can be increased. Error generated by misalignment of sensors or other parts of the positioning system 100 during manufacturing and assembly of the positioning system 100 can be compensated when the sensor outputs are compared with the calibrated lookup table 324.

The field direction sensor 110 is placed at a distance D sufficiently far away from the stator coils so that the field direction sensor 110 is not affected by the magnetic field 140 from the stator coils. This requirement is compatible with the position requirement of the Hall effect sensors, and thus the same circuit board of the position sensor assembly 120 can be used to hold the field direction sensor 110 and the Hall effect sensors 122. Magnetic shielding schemes can also be used to prevent the fields from the motor coils from affecting the armature magnet field at the location of the field direction sensor 110.

Figure 5:
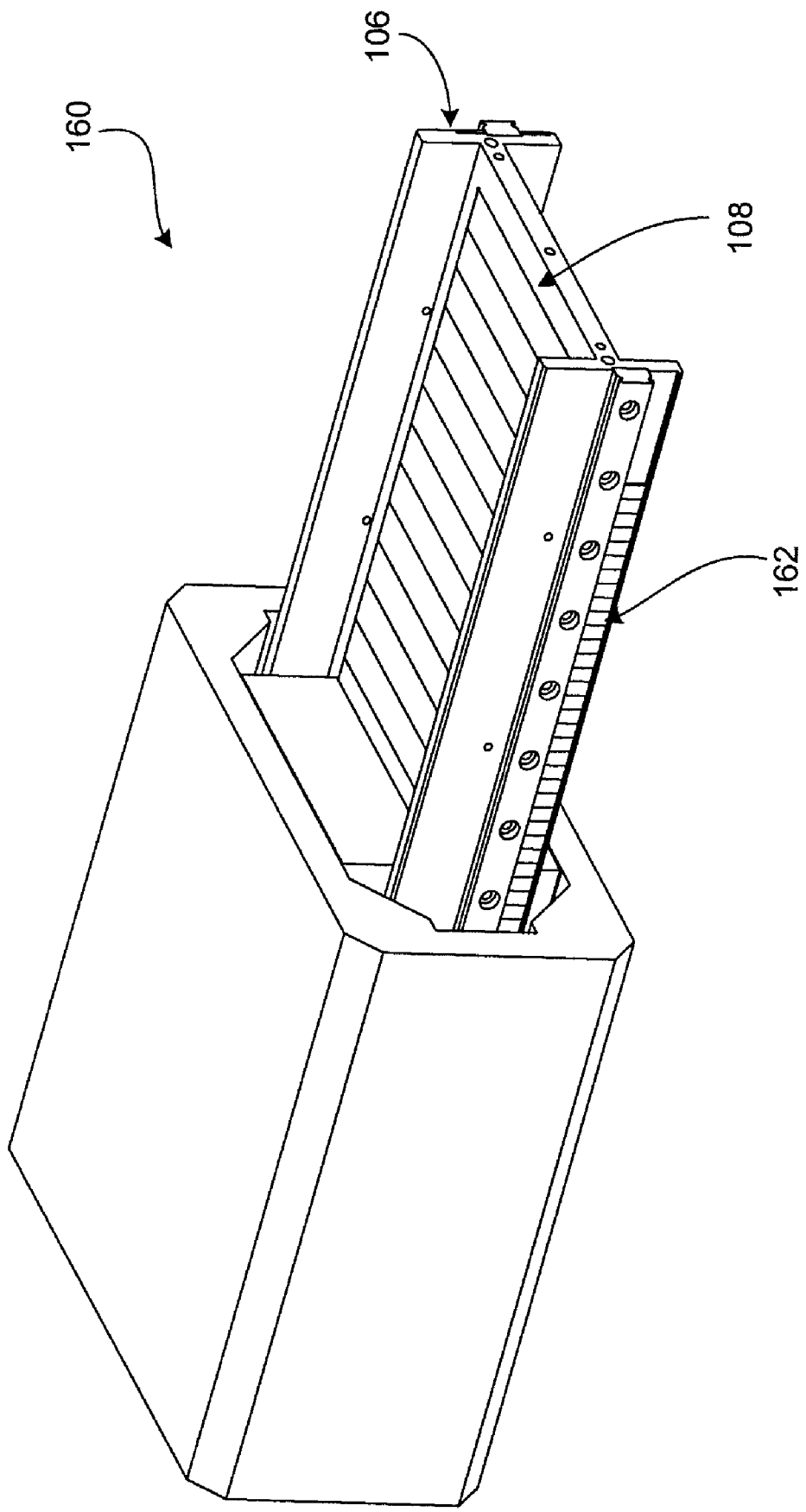
FIGS. 5 and 6 are schematic views of positioning systems.

Referring to FIG. 5, in some implementations, a positioning system 160 uses a series of additional magnets 162, placed on side of the armature 106, having a pitch smaller than the armature magnets 108 to provide fine positioning information. A field direction sensor (obscured from view by other components in the figure) that measures the direction of the magnetic field generated by the small-pitch magnets 162 can be used to determine a high-resolution relative position of the armature 106. By combining measurement data from the Hall effect sensors 122 and the field direction sensor, a high-resolution absolute position of the armature 106 can be determined.

In some examples, the small-pitch magnets 162 include discrete magnets with alternating polarities. In some examples, the magnets 162 can be made from a strip magnet having regions with alternating polarities. The discrete magnets or strip magnet can be placed on a steel backing.

The example of FIG. 1 uses Hall effect sensors 122 that detect the end armature magnet 108a for coarse position sensing. Other methods of coarse position sensing can be used, as described below.

Figure 6:
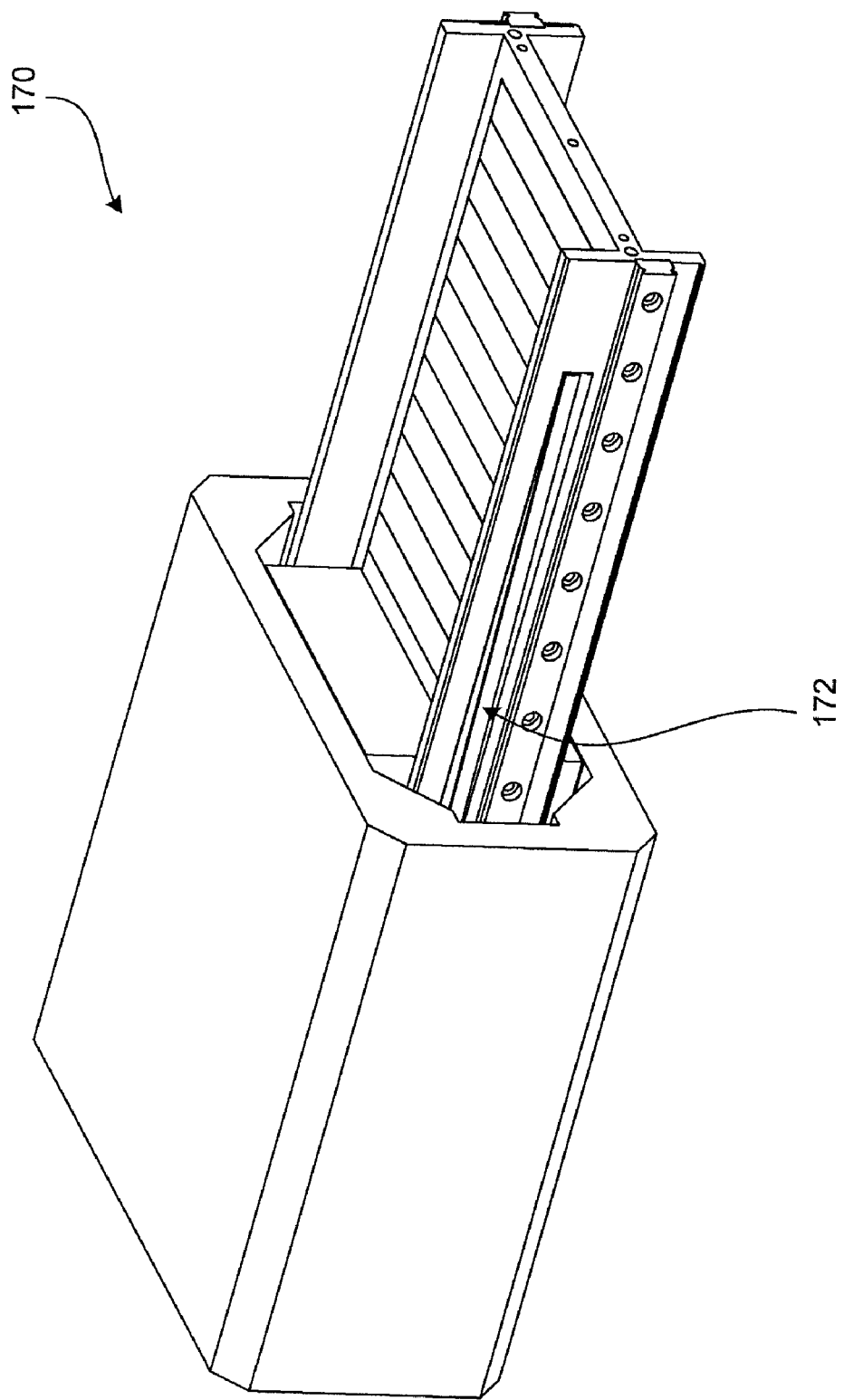

Referring to FIG. 6, in some implementations, a positioning system 170 uses an angled elongated magnet 172 (which is an elongated magnet mounted at an angle with respect to the direction of motion of the armature 106) for generating a magnetic field used in coarse position sensing. The elongated magnet 172 can be similar to the strip magnets used in refrigerator magnetic seals. The elongated magnet 172 extends a length comparable to the travel length of the armature 106 and, because it is mounted at an angle with respect to the direction of motion which in one example is substantially horizontal as shown in FIG. 4 (141), can provide a magnetic field component having a direction in a plane perpendicular to the direction of motion that varies across the entire travel length. The changes in magnetic field direction can be detected by a magnetic field direction sensor 182 (see FIG. 7) to provide coarse absolute positioning information. In some applications, this absolute position measurement may provide sufficient accuracy for certain applications and not require any other component for finer resolution measurement.

Figure 7:
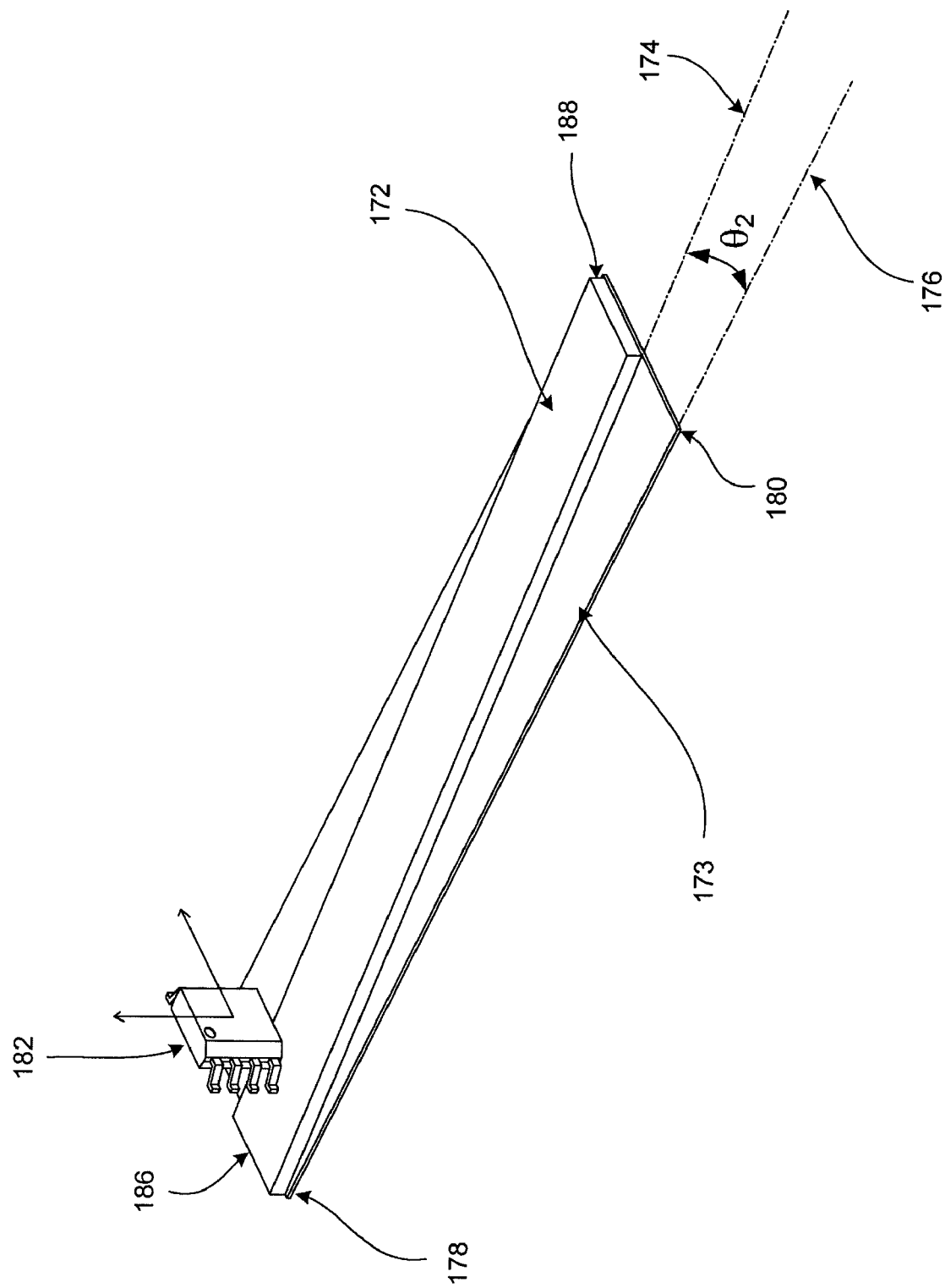
FIG. 7 is a schematic view of an angled elongated magnet.

Referring to FIG. 7, in some examples, the elongated magnet 172 can be a single polarity strip magnet 172 that is placed on a steel backing 173 and oriented such that the lengthwise direction 174 of the elongated magnet 172 is at an angle θ 2 relative to the armature travel direction 176. The elongated magnet 172 has one end 186 at a first location 178 and extends to another end 188 at a second location 180 on the steel backing 173.

Figure 8A:
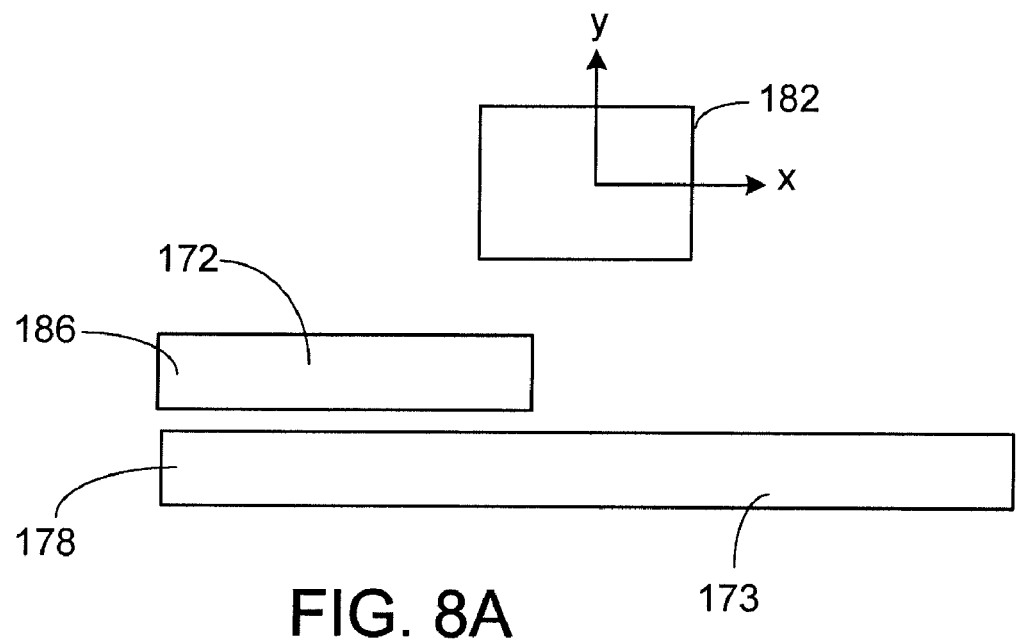
FIGS. 8A and 8B are cross sectional views of a sensor and the angled magnet.
Figure 8B:
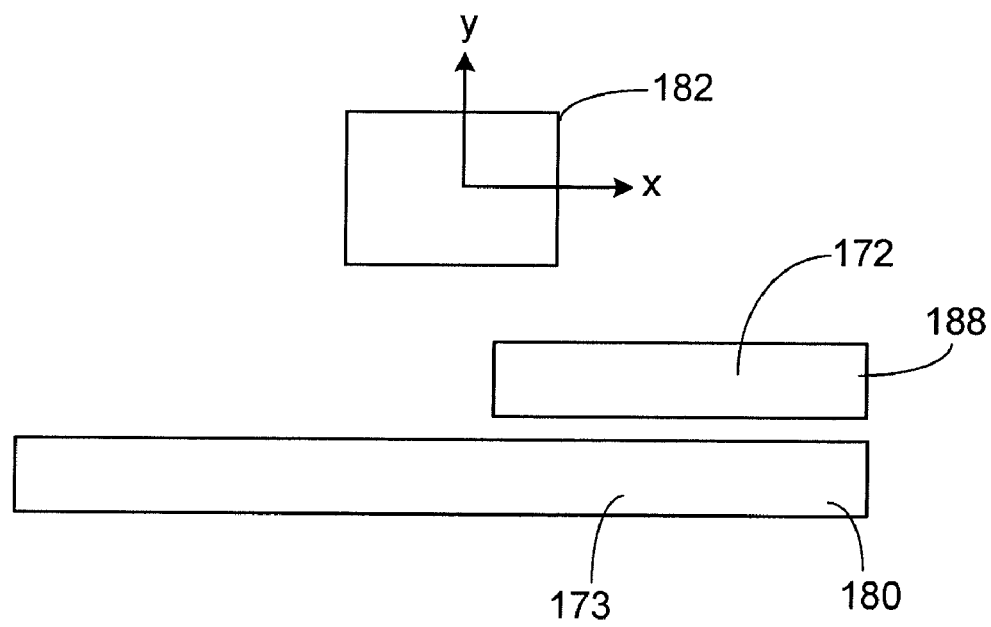

FIG. 8A is a cross sectional view of the steel backing 173, the sensor 182, and the end 186 of the elongated magnet 172. FIG. 8B is a cross sectional view of the steel backing 173, the sensor 182, and the other end 188 of the elongated magnet 172. The magnetic field sensor 182 is positioned such that when viewed in the direction of armature movement, the end 186 of the angled magnet 172 is located at the lower left side of the sensor 182, and the other end 188 of the strip magnet 172 is located at the lower right side of the sensor 182. As the armature 106 moves, the distribution of the magnetic field near the field direction sensor 182 changes accordingly.

In this description, the terms "left", "right", "upper", "lower", "horizontal", and "vertical" refer to relative positions of components in the figures. The components can have other positions or orientations.

Figure 9A:
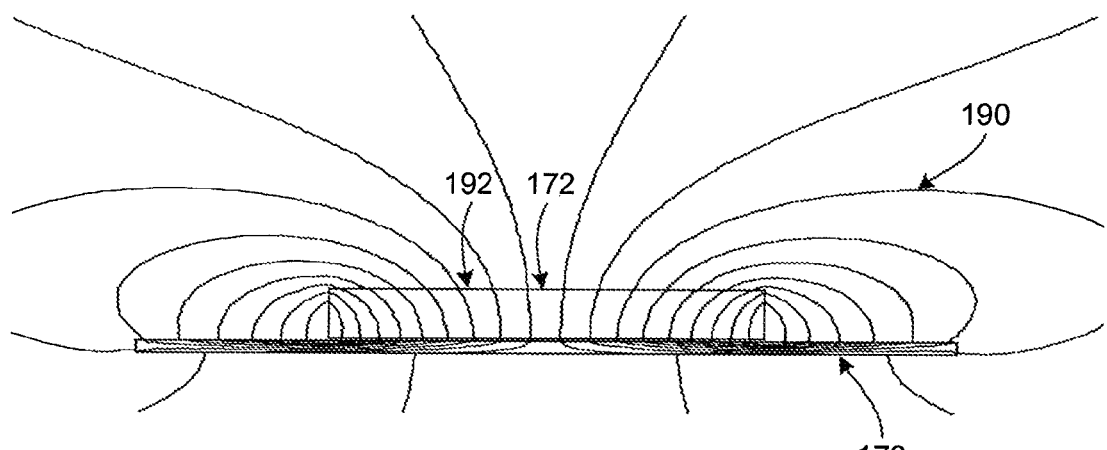
FIG. 9A and FIG. 9B are diagrams showing magnetic field distribution.
Figure 9B:
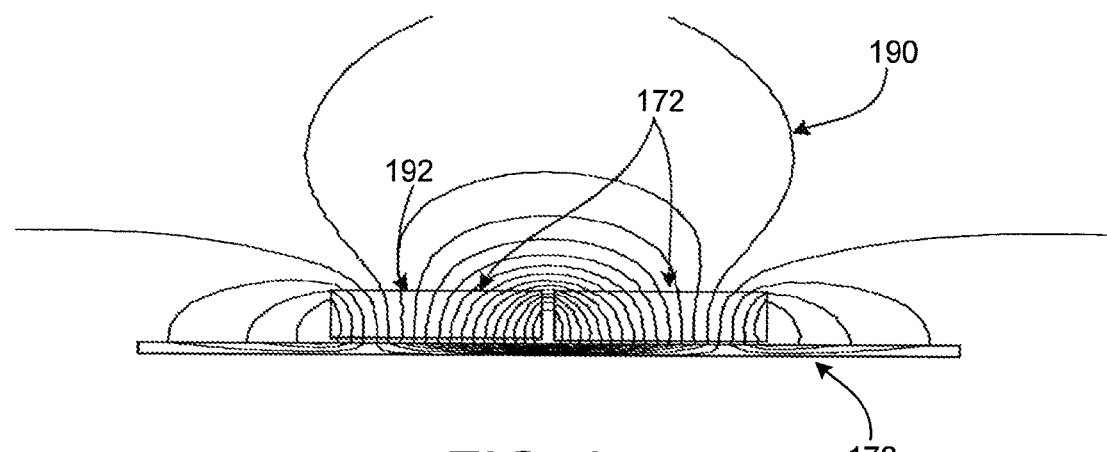

FIG. 9A shows a distribution of a magnetic field 190 of an one-pole magnetization of elongated magnet 172. FIG. 9B shows a distribution of a magnetic field 190 of a two-pole magnetization of elongated magnet 172. The steel backing 173 is attached to the armature 106, whereas the field direction sensor 182 is located at a fixed position relative to the stator 104. When the armature 106 moves relative to the stator 104, the angled elongated magnet 172 moves relative to the sensor 182. When the armature 106 moves the full length of its stroke, the field direction sensor 182 changes from being at a position A to a position B relative to the magnet 172.

The sensor 182 is oriented to detect Bx and By components of the magnetic field 190. In this example, the Bx component is perpendicular to the travel path of the armature 106. The By component is perpendicular to the travel path of the armature 106 and normal to the upper surface 192 of the magnet 172.

Figure 10:
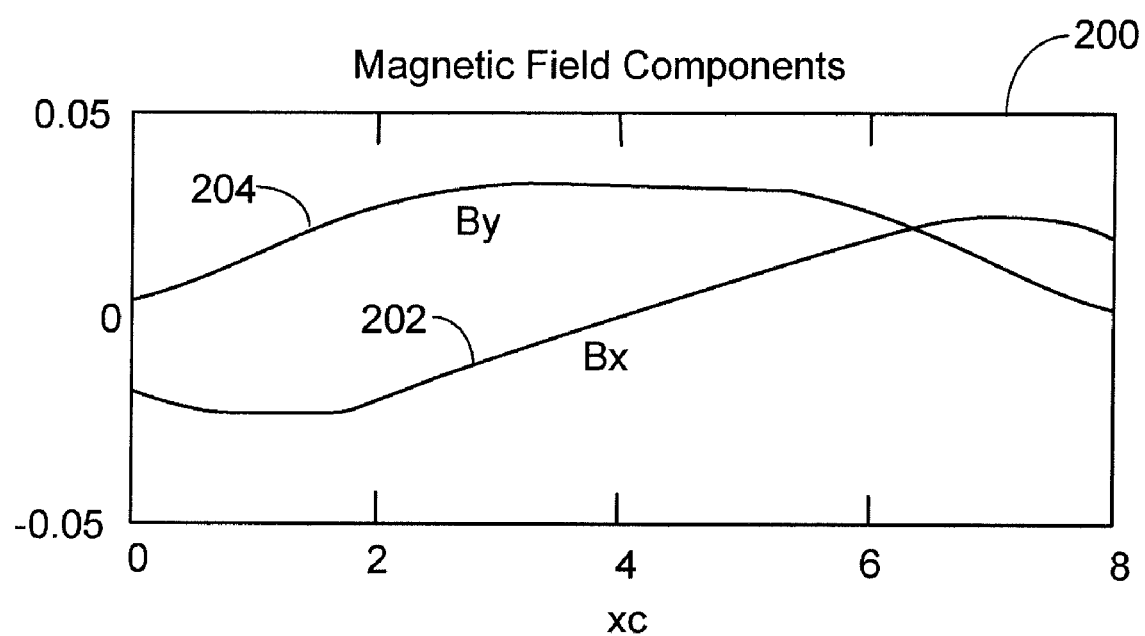
FIG. 10 is a graph showing a relationship between magnetic field components and magnet shift positions.

FIG. 10 is a graph 200 having curves 202 and 204 representing the amplitude of the Bx and By components, respectively, of the magnetic field 190 versus positions of the armature 106. The horizontal axis represents the distance (millimeter) of the armature movement, and the vertical axis represents the magnitude (Gauss) of the Bx and By components. By limiting the angle of attachment for a given magnet strip and steel backing design, the combination of the measurements of Bx and By components are unique for each position of the armature 106 for the entire stroke. Thus, the output from the field direction sensor 182 can be used to determine an absolution position of the armature 106.

Figure 11A:
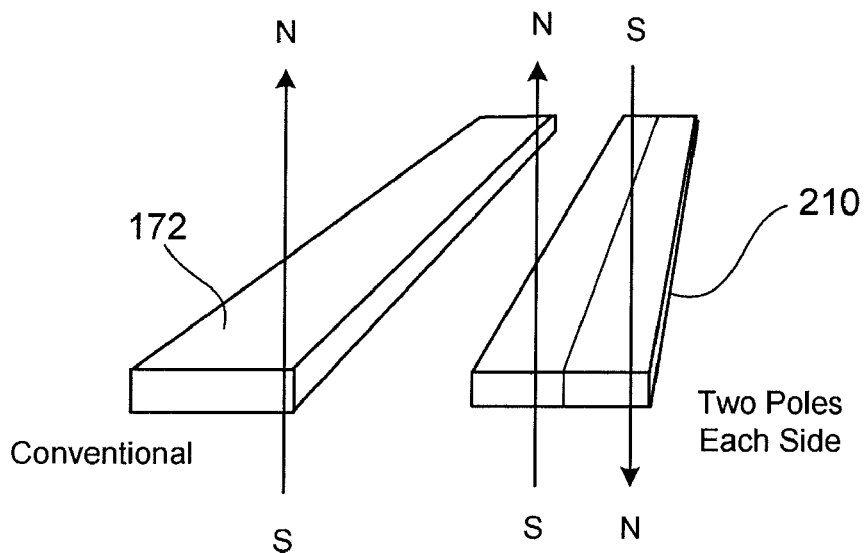
FIG. 11A is a diagram of elongated magnets.

Referring to FIG. 11A, the elongated magnet 172 is shown to have one pole. An elongated magnet 210 having two poles can also be used. The two poles of the elongated magnet 210 are oriented to have opposite polarities to provide greater changes in the magnetic field direction, as measured by the field direction sensor, across the length of the elongated magnet 210 when placed at an angle with respect to the armature travel direction.

Figure 11B:
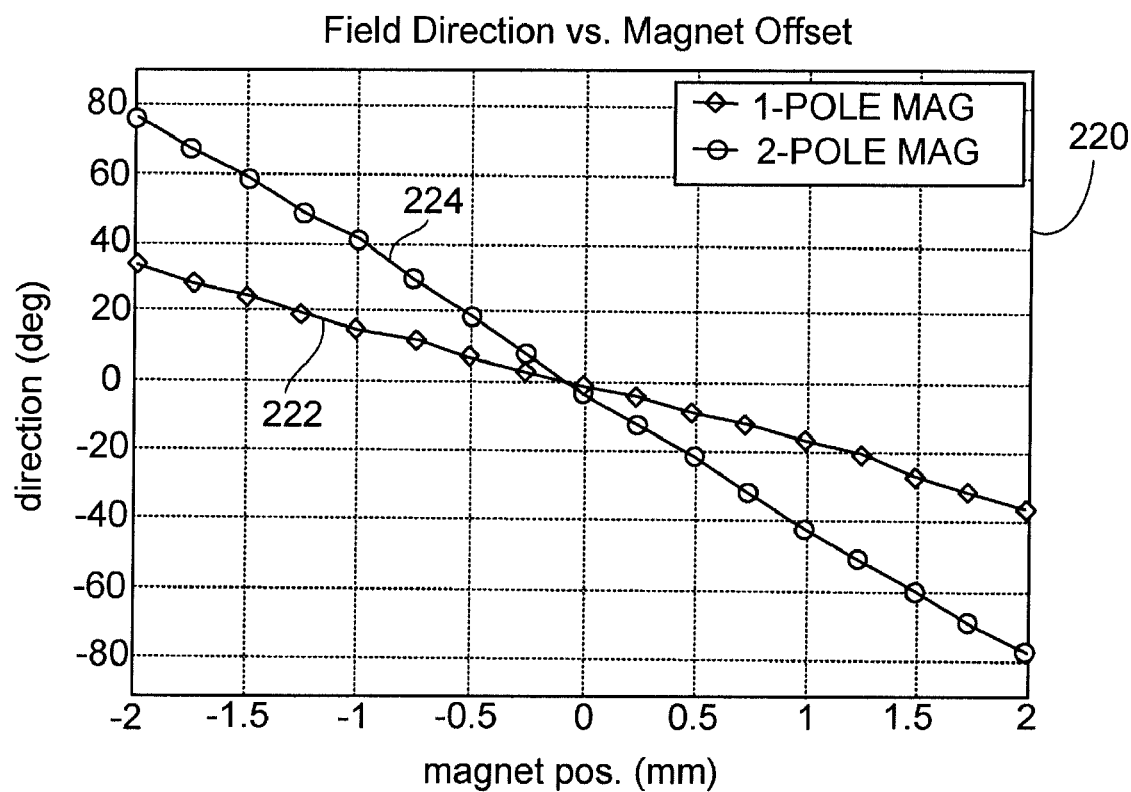
FIG. 11B is a graph showing a relationship between magnetic field directions and magnet shift positions.

Referring to FIG. 11B, a graph 220 shows a curve 222 representing a 2D finite element field relationship between the magnetic field direction and the position of the angled 1-pole elongated magnet 172 relative to the sensor 182 in the x-direction (see FIGS. 8A and 8B). A curve 224 shows a relationship between the magnetic field direction and the position of the angled 2-pole elongated magnet 210 relative to the sensor 182 in the x-direction. In this example, each magnet shifts from −2 mm to +2 mm in the x-direction. A comparison of the curves 222 and 224 indicates that the change in the magnetic field direction for the angled 2-pole elongated magnet 210 is about twice as much as that of the angled 1-pole elongated magnet 172.

The relationship shown in the graph 220 were made using 3.4 MGOe strip magnets. The magnets 172 and 210 were oriented such that there is a 4 mm shift in the x-direction from one end of the magnet to the other end (e.g., the distance between positions A and B in FIG. 9 is 4 mm). For the angled 1-pole strip magnet 172, the change in magnetic field direction was 69°. By comparison, for the angled 2-pole elongated magnet 210, the change in magnetic field direction was 152°.

Comparing the angled 1-pole and 2-pole elongated magnets, the advantage of using the angled 2-pole elongated magnet 210 is that a greater magnetic field direction change can be obtained. The advantage of using the angled 1-pole elongated magnet 172 is that, for the same overall magnet dimensions, the 1-pole strip magnet 172 can generate a stronger magnetic field, which may provide a higher signal-to-noise ratio during measurements.

Figure 12A:
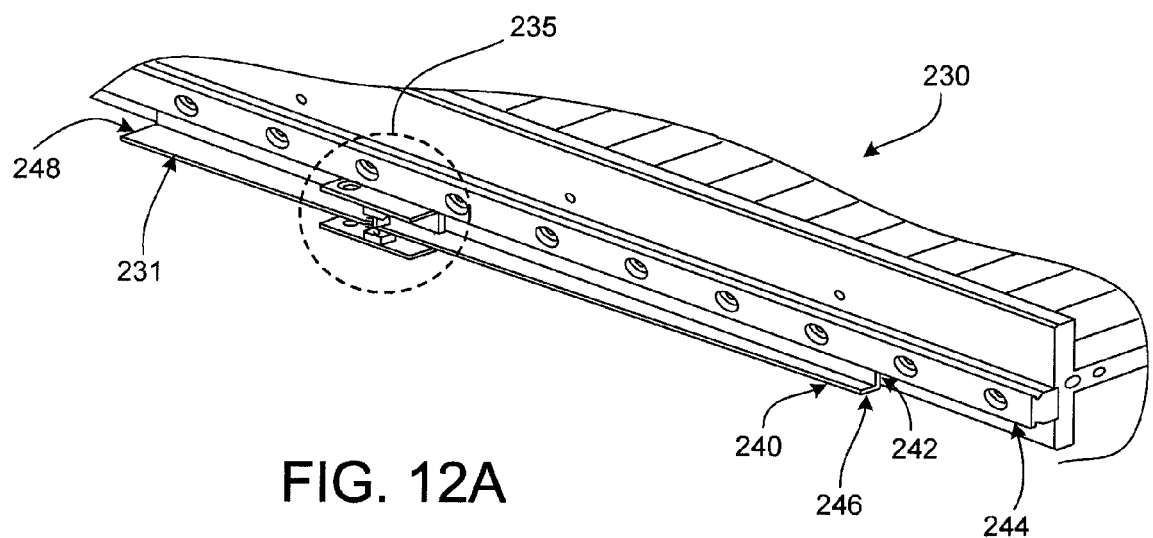
FIGS. 12A and 12B are schematic views of a positioning system.
Figure 12B:
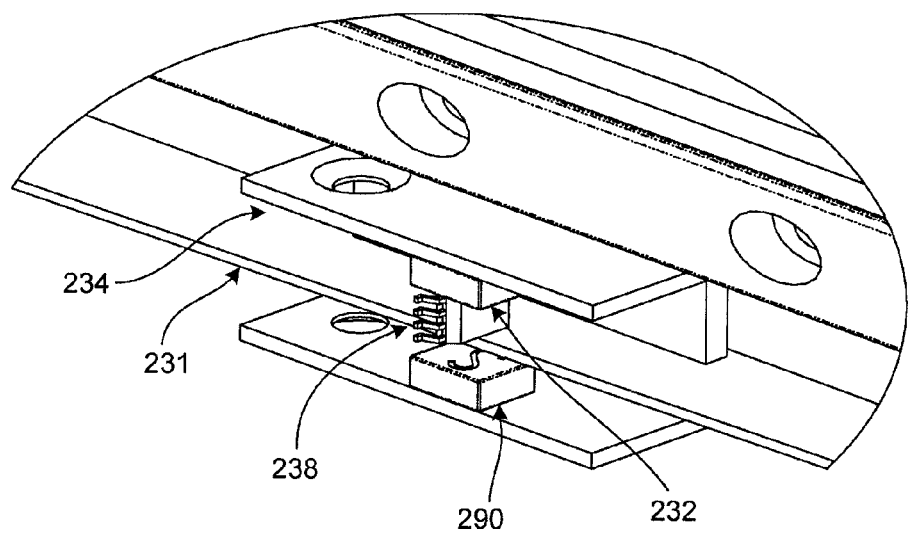

Referring to FIGS. 12A and 12B, in some implementations, a positioning system 230 obtains coarse positioning information by using a tapered steel blade 231 to change a distribution of a magnetic field when the armature 106 moves. FIG. 12B is an enlarged view of a portion 235 of FIG. 12A. The magnetic field is generated by one or more permanent magnets (e.g., 232 and 290), and the magnetic field direction is detected by a magnetic field direction sensor 238.

Figure 12C:
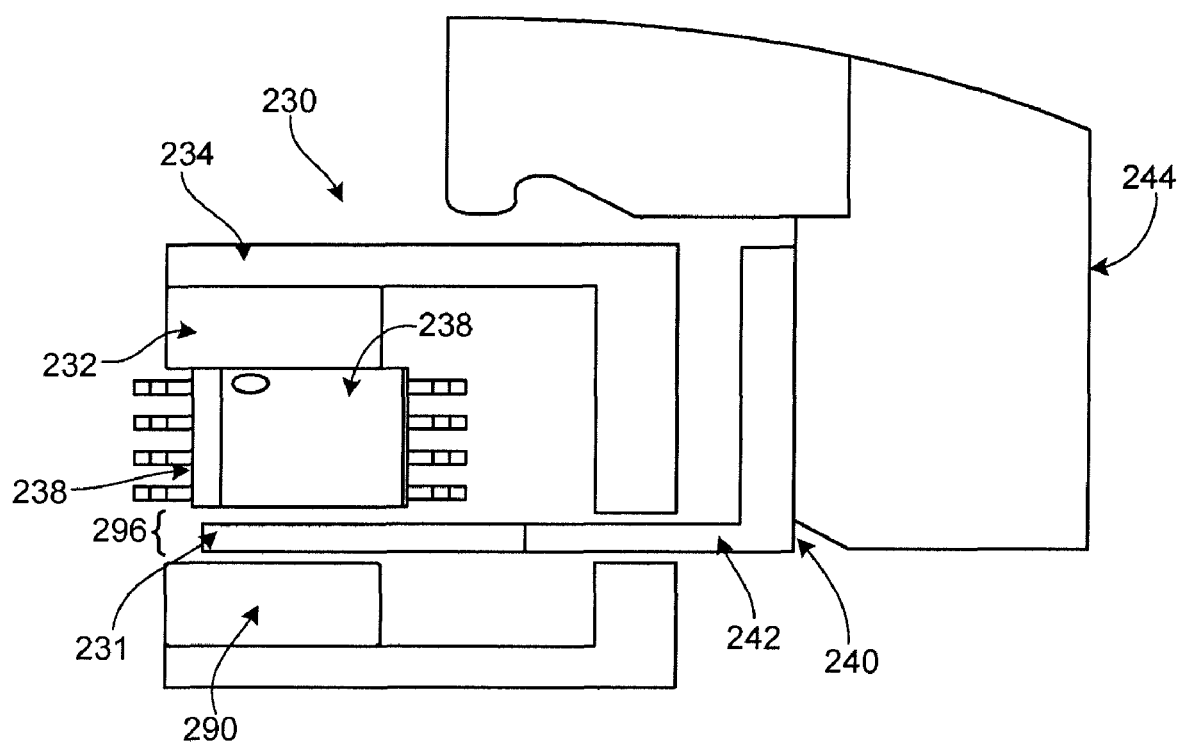
FIG. 12C is a cross sectional view of the positioning system.

FIG. 12C is a cross sectional view of the positioning system 230. Steel component(s) 234 can be provided in which the steel component(s) 234 and the steel blade 231 provide a high magnetic permeability path.

The steel blade 231 can be, for example, a part of a steel piece 240. The steel piece 240 can have a portion 242 attached to a support 244, which in turn is coupled to the armature 106. The steel blade 231 extends outward from the support 244 and has a tapered shape so that one end 246 of the steel blade 231 is narrower than the other end 248 of the steel blade 231. A portion of the steel blade 231 passes a region 296 between the sensor 238 and the magnet 290. When the armature 106 travels over its full stroke, the width of the portion of the steel blade 231 in the region 296 changes. Because the steel blade 231 has a higher magnetic permeability than air, changing the width of the portion of the steel blade 231 in the region 296 changes the distribution of magnetic field near the field direction sensor 238.

Figure 13A:
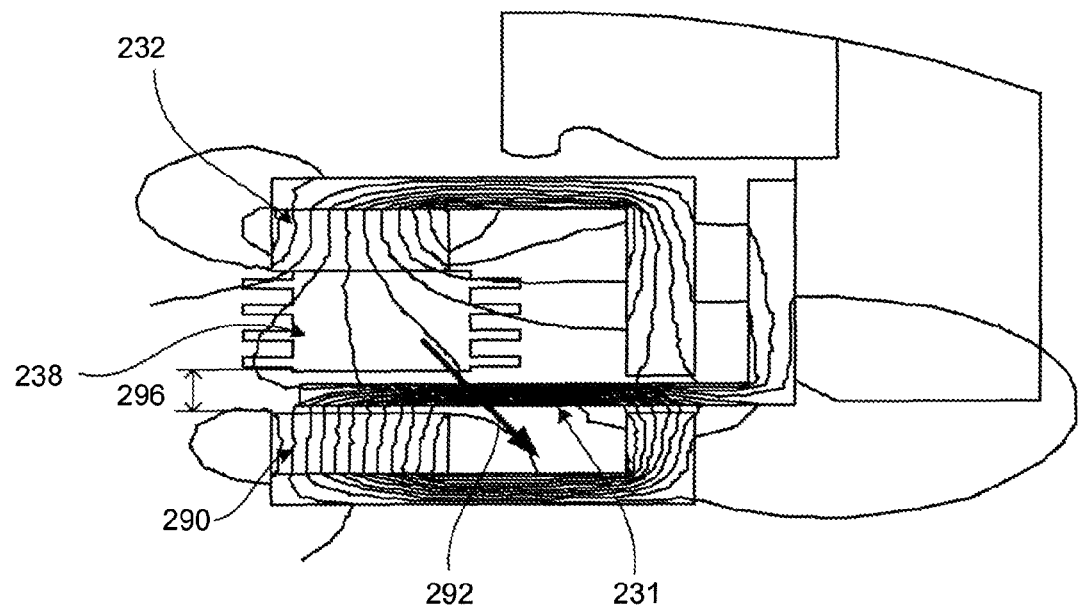
FIGS. 13A and 13B are diagrams showing distributions of magnetic fields.
Figure 13B:
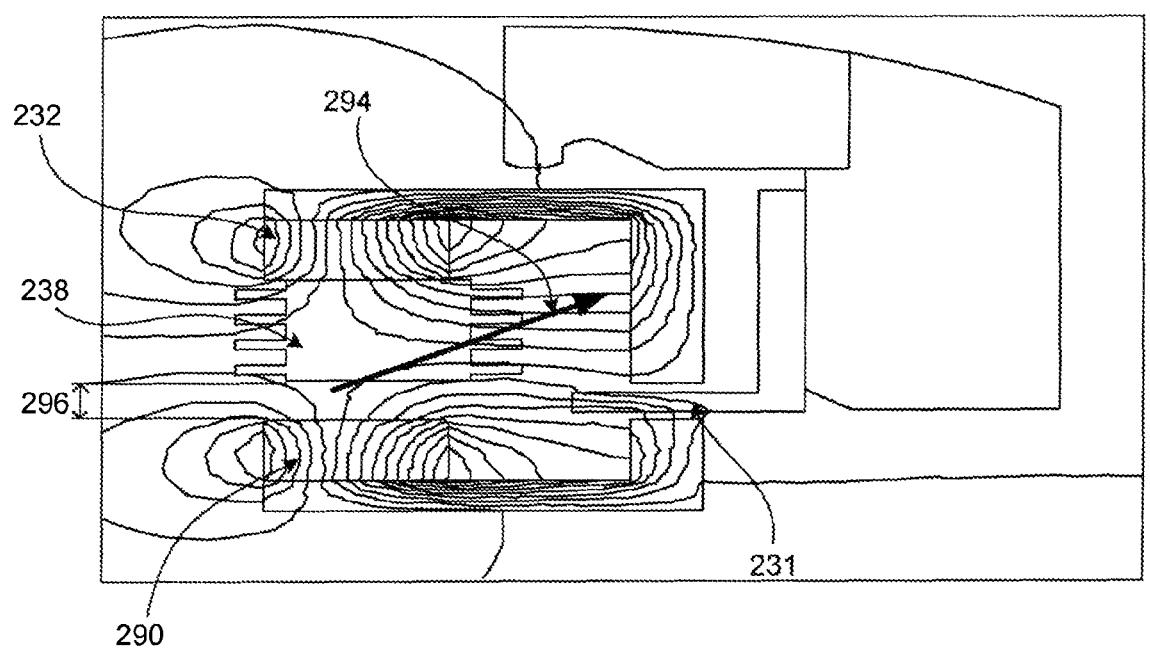

FIGS. 13A and 13B show simulations of the magnetic field distributions of the two permanent magnets 232 and 290 when a steel blade 231 is at two different positions. When the wider end 248 of the steel blade 231 is in the region 296 (as shown in FIG. 13A), a higher density of magnetic flux passes through the steel blade 231. In this example, the magnetic field detected by the field direction sensor 238 has a direction 292. When the narrower end 246 of the steel blade 231 is in the region 296 (as shown in FIG. 13B), a lower density of magnetic flux passes through the steel blade 231. In this example, the magnetic field detected by the field direction sensor 238 has a direction 294. This indicates that when the armature 106 travels over its full stroke, the magnetic field direction changes between directions 292 and 294.

Various system parameters such as the number of magnets, size and position of each magnet, size and shape of the flux-carrying steel parts and the location of the field direction sensor 238 can be selected such that there is sufficient magnetic field strength to allow the field direction sensor 238 to operate properly, and that there is a sufficiently large difference in the magnetic field direction when the armature 106 travels the entire stroke.

The steel blade 231, the field direction sensor 238, and the magnets 232 and 290 can have various positions and orientations to accommodate various design constraints, such as limitations on available spaces.

Figure 14:
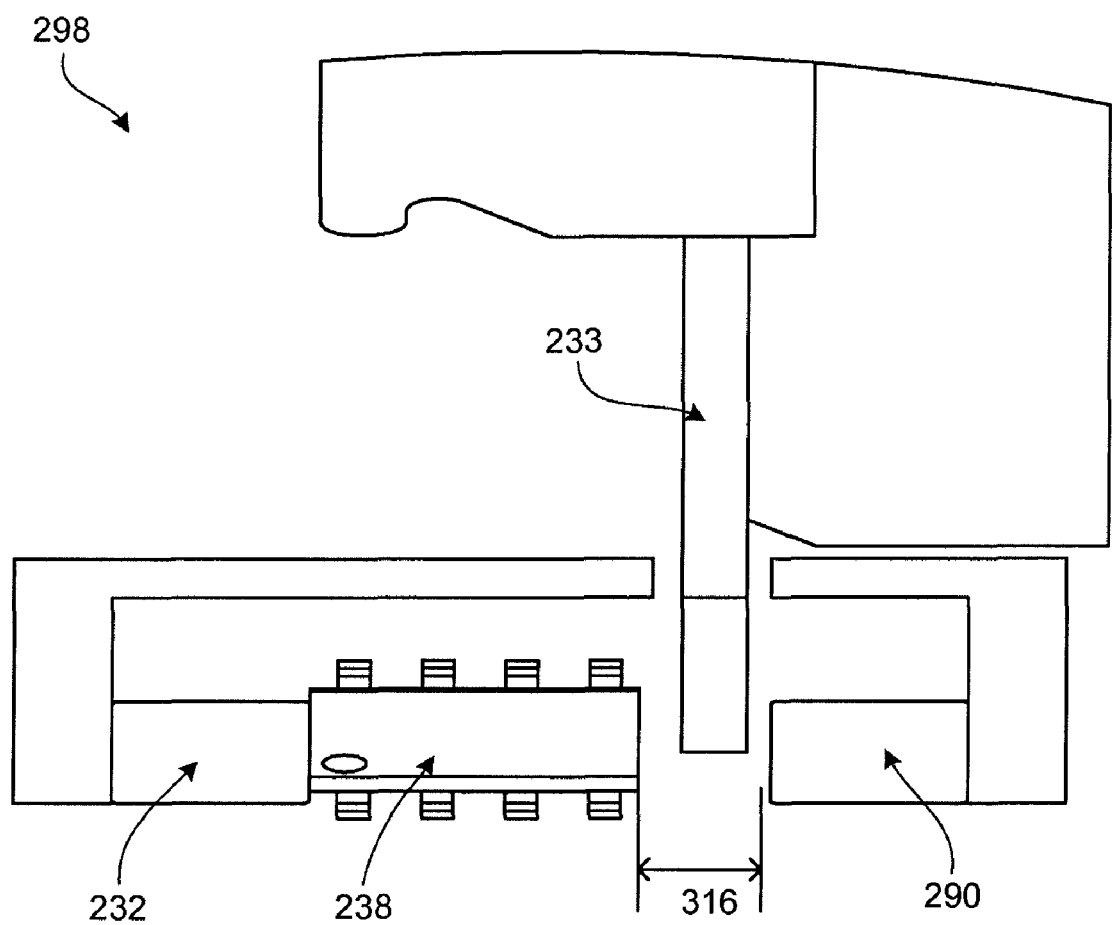
FIG. 14 is a schematic view of a positioning system.

Referring to FIG. 14, in some implementations, a positioning system 298 similar to the positioning system 230 (FIG. 12A) uses a steel blade 233 and a field direction sensor 238 that are rotated 90° compared to those in the system 230. As the armature 106 moves, the amount of the steel blade 233 extending into a region 316 between the field direction sensor 238 and the magnet, or magnets, 290 changes, thereby changing the distribution of magnetic field near the field direction sensor 238, similar to the situation in FIG. 12A. The orientation of the positioning system may be adjusted to utilize open spaces of the linear motor to reduce the overall size of the combination of the positioning system and the linear motor.

Figure 15:
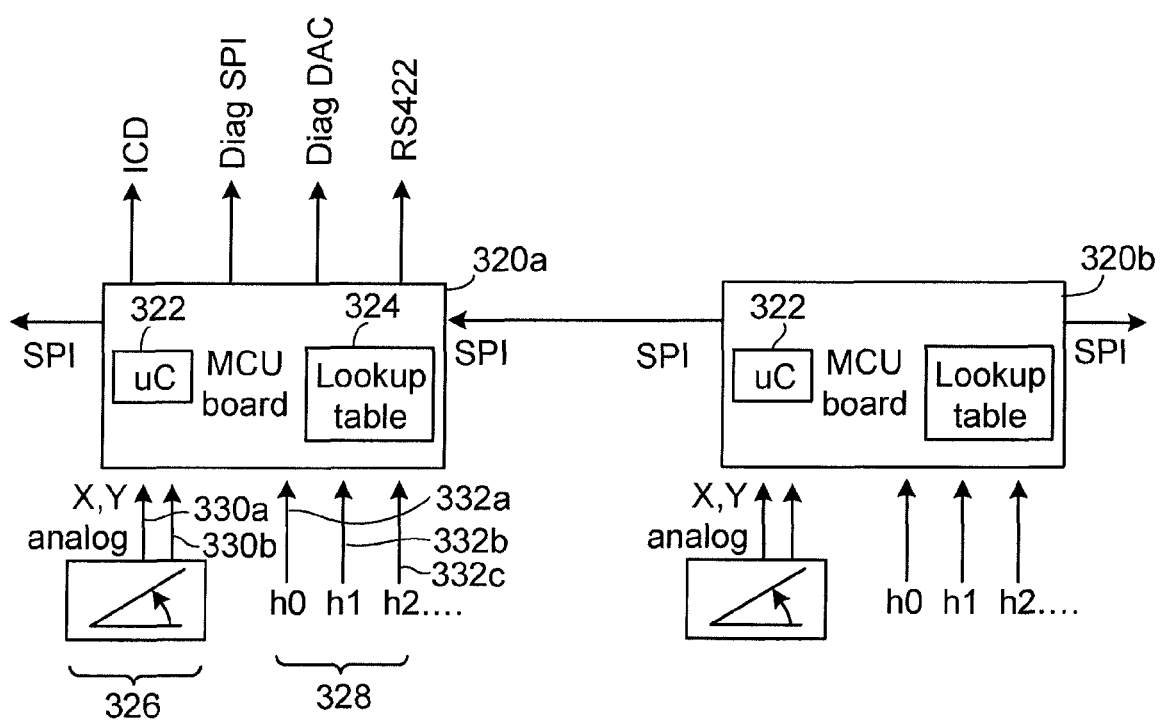
FIG. 15 is a block diagram of microcontroller boards.

Referring to FIG. 15, in some implementations, the positioning system 100 (FIG. 1), 160 (FIG. 5), 170 (FIG. 6), 230 (FIG. 12A), and 298 (FIG. 14) each includes microcontroller unit (MCU) boards 320a and 320b for determining the position of the armature 106. The MCU board 320a includes a microcontroller 322 that processes signals 330a and 330b (collectively referenced as 326) from the field direction sensor 110a and signals 332a, 332b, 332c, etc. (collectively referenced as 328), from the Hall effect sensors 122 located at the first side 112a. The MCU board 320b includes a microcontroller 322 that processes signals from the field direction sensor 110b and the Hall effect sensors 122 located at the second side 112b. In some examples, a single MCU can be used to process the field direction sensor 110 and Hall effect sensor 122 signals from both boards 320a and 320b.

The signals 330a and 330b represent measurements of two components of the magnetic field that can be used to determine a direction or angle of the magnetic field. The magnetic field direction can be used to determine a high-resolution relative position of the armature 106. The signals 332a, 332b, and 332c, etc., represent measurements from the Hall effect sensors 122 and can be used to determine a coarse absolute position of the armature 106. The microcontroller 322 combines the signals 326 and 328 to determine a high-resolution absolute position of the armature 106 relative to the stator 104. The MCU boards 320a and 320b perform similar position measurements, but over different portions of the travel of the armature 106, so that a valid position measurement is available for any armature position. Some overlap of the region of coverage can provide valid measurements when the armature's movement requires the transition from one board's measurement region to the other. A large overlap of the two measurement regions offers the benefit of permitting the position reading to be the average of a valid reading from each board on opposite ends of the motor. This averaging would tend to cancel position errors caused by thermal expansion effects and reduce error from random electrical noise. For example, the positioning system can provide accurate positioning over a wide range of temperature, such as from −40° C. to +120° C. The MCU boards 320a and 320b communicate with each other, and as shown, the MCU on board 320a has the added task of determining the board, or boards, currently providing valid position data, averaging when appropriate, and communicating the position measurement to external systems requiring the data After the positioning system 100 is assembled and tested, a calibration process is performed in which the measurements from the field direction sensors 110 and Hall effect sensors 122 are compared with measurements made by an external calibrated instrument that measures the position of the armature 106. The calibrated measurements are stored in a calibrated lookup table 324.

Figure 16:
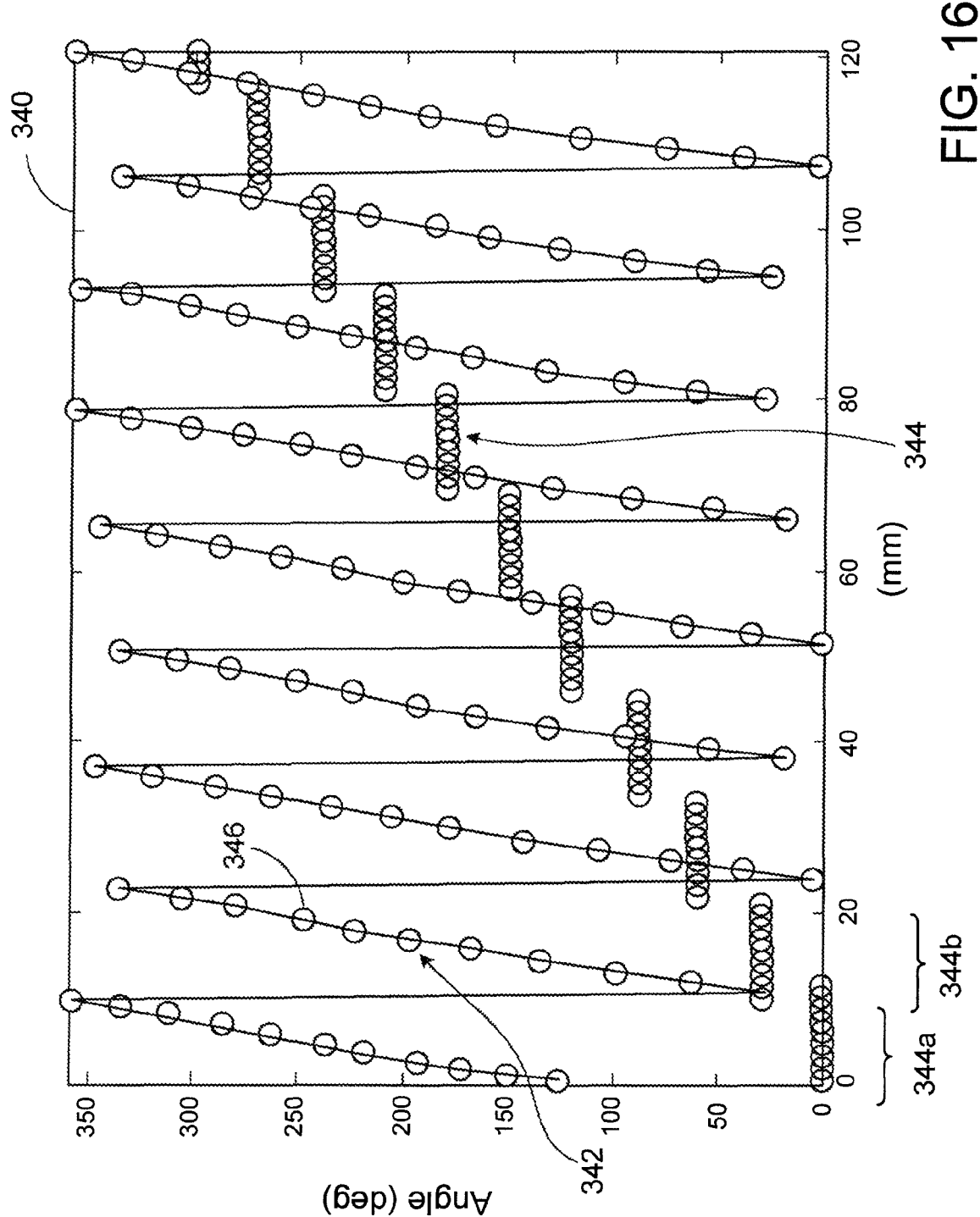
FIG. 16 is a graph representing data stored in a calibrated lookup table.

Referring to FIG. 16, a graph 340 shows calibrated measurements stored in the calibrated lookup table 324 for use in the positioning system 100 (FIG. 1). Each circle in the graph 340 corresponds to measurement values stored in the lookup table 324. The horizontal axis of the graph 340 represents the position of the armature 106. In this example, the armature 106 travels 120 mm, representing the portion of travel measured by one of the measurement boards.

The graph 340 includes two sets of data. A first set of data 342 (represented by circles forming a saw tooth-like function) include angle measurement data obtained from the field direction sensors 110. The first set of data 342 indicate that the direction of the magnetic field changes periodically with armature 106 position. For example, when the armature 106 moves from 0 to about 9 mm, the magnetic field direction changes from about 125° to 359°. When the armature 106 moves from about 9 mm to about 21 mm, the magnetic field direction changes from about 26° to about 330°, etc. The angle measurements provide relative positioning because each angle value can correspond to several possible armature positions.

A second set of data 344 (represented by circles forming a step-like function) represent the end magnet position, as determined by the outputs from the Hall effect sensors 122. The second set of data 344 include subsets of data, each subset corresponding to one of the Hall effect sensors 122. For example, a first subset of data 344a indicate that when the armature position is between about 0 to 9 mm, the first Hall effect sensor 122a (see FIG. 2) detects the end position of the armature 106. A second subset of data 344b indicate that when the armature position is between about 9 to 21 mm, the second Hall effect sensor 122b detects the end position of the armature 106, and so forth.

After the calibrated lookup table 324 has been established, measurements from the sensors are compared with the values in the lookup table 324 to determine an accurate position of the armature 106. For example, the outputs from the Hall effect sensors 122 are compared with the second set of data 344 to determine a low-resolution absolute position. The Hall effect sensor signals can be used to determine whether the armature 106 is located between, for example, 0 to 9 mm, or between 9 to 21 mm, etc.

The outputs from the field direction sensors 110 are compared with the first set of data 342 to determine a high resolution absolute position. For example, suppose the Hall effect sensors 122 indicate that the armature 106 is between 9 to 21 mm, and the field direction sensors 110 indicate that the direction of the magnetic field has an angle of about 247°. The sensor measurements match a data point 346 in the lookup table 342, and the data point 346 indicates that the armature 106 is at a position of about 19 mm.

The greater the number of calibrated measurements stored in the lookup table 324, the more accurate the subsequent position measurements can be. The lookup table 324 can be stored in a non-volatile memory such as a flash memory or an electrically erasable programmable read-only memory (EEPROM). Due to the capacity of the non-volatile memory, a limited number of calibrated measurements can be stored in the lookup table 324.

If the magnetic field angle measurement does not match a value stored in the lookup table 324, an interpolation process can be used to estimate the position of the armature 106. For example, suppose the field direction sensor 110 outputs an angle measurement x, and the lookup table 324 has angle values $x_n$ and $x_{n+1}$, where $x_n < x < x_{n+1}$, $x_n$ corresponds to an armature position $y_n$, and $x_{n+1}$ corresponds to an armature position $y_{n+1}$. Using linear interpolation, the angle x can be determined to correspond to an armature position $y = y_n + \Delta y$, where $\Delta y = m_n \cdot \Delta x$, $\Delta x = x - x_n$, and $m_n = (y_{n+1} - y_n)/(x_{n+1} - x_n)$. The slope $m_n$ can be calculated in advance and stored in the lookup table 324 in order to reduce the time needed by the MCU to perform the interpolation calculation. Interpolation between two angle values that straddle a 360 degree wrap-around discontinuity can be performed by adding or subtracting an offset of 360 degrees to one of the points, as appropriate, to effectively un-do the wrap-around discontinuity, and then perform the interpolation These offset values can be calculated in advance and stored in the table to reduce the interpolation computation time As can be seen in FIG. 16, the magnetic field angle versus armature position relationship is not continuous. This is due to the angle value being mathematically restricted to the range of 0 to 360 degrees, resulting in an instantaneous change, or wrap-around, when falling below 0 or rising above 360 degrees. Similarly, the relationship between the armature position and the coarse position determined from Hall effect sensor outputs is also not continuous. To increase the accuracy of armature position measurement, additional data points representing measurements made using smaller position increments near locations where the discontinuities occur can be stored in the calibrated lookup table 324.

Although various implementations have been described, other implementations are within the scope of the following claims. For example, when a linear motor is used in the positioning system 100 of FIG. 1, having a limited stroke such that armature magnets on one side of the motor are always exposed to sensors, only one MCU board 320 need to be used. The positioning systems 100, 160, 170, 230, and 298 can be used in applications other than suspension systems, such as determining positions of moving parts of various machines, e.g., robots.

In some applications, the coarse position sensing alone may provide sufficient resolution. For example, when the positioning system 170 is used in applications that do not require high precision armature positioning, coarse position sensing based on effects of the angled elongated magnet 172 alone may be sufficient. Similarly, when the positioning system 230 is used in applications that do not require high precision armature positioning, coarse position sensing based on effects of the tapered steel blade 231 alone may be sufficient.

The components of the positioning systems can have configurations and use materials different from those described above. For example, various types of magnetic sensors can be used, such as magnetoresistance angular sensor HMC1501 or HMC1512, available from Honeywell Corp., or field direction sensors based upon the Hall effect, available from Melexis Corp. Various types of magnets can be used. The orientations of the north and south poles of the magnets can be different from those described above. The steel blade 231 (FIG. 12A) can have various shapes. More than one steel blade can be used. The steel blade 231 can be replaced with a non-steel material that has a magnetic permeability different from that of air. The non-volatile memory storing the lookup table 324 can be built-in or external to the microcontroller 322.

The calibrated lookup tables used with positioning systems 170, 230, and 298 may be different from the lookup table represented by the graph 340. For example, a calibrated lookup table for the positioning system 170 may include calibrated measurements for the direction of the magnetic field generated by the angled elongated magnet 172 for various armature positions. A calibrated lookup table for the positioning system 230 and 240 may include calibrated measurements for the direction of the magnetic field generated by the magnets 232 and 290 for various armature positions. The lookup tables may be updated and re-calibrated during maintenance of the positioning systems.

What is claimed is:

1. An apparatus comprising:
an armature of a linear motor comprising a series of magnets generating a magnetic field and defining a path having a first end and a second end, wherein the series of magnets comprises a first end magnet located at the first end;
a stator of the linear motor comprising coils to interact with the magnetic field generated by the series of magnets of the armature to move the armature relative to the stator along the path; and
a plurality of sensors located at fixed positions relative to the stator to sense at least a portion of the magnetic field that is generated by the first end magnet of the series of magnets to determine an absolute position of the armature relative to the stator throughout movement of the armature along the path between the first end and the second end.

2. The apparatus of claim 1 in which a sensor of the plurality of sensors determines the angle of the direction of the sensed magnetic field relative to a reference direction.

3. The apparatus of claim 1 in which the plurality of sensors comprises a first magnetic sensor detecting the portion of the magnetic field that is generated by the first end magnet, and a second magnetic sensor detecting a portion of the magnetic field that is generated by a second end magnet located at the second end of the series of magnets of the armature.

4. The apparatus of claim 1 in which a sensor of the plurality of sensors compensates for variations in strength of the magnetic field.

5. The apparatus of claim 4 in which the variations in strength of the magnetic field are caused by a factor chosen from the group consisting of temperature changes, distance, another magnetic field.

6. The apparatus of claim 5 in which the sensor compensates for the variations in strength of the magnetic by using ratio of a first measurement of the magnetic field in a first direction and a second measurement of the magnetic field in a second direction.

7. The apparatus of claim 1 in which a sensor of the plurality of sensors measures a first measurement of the magnetic field in a first direction and a second measurement of the magnetic field in a second direction.

8. The apparatus of claim 7 in which the sensor measures the first and second measurements by measuring amplitudes of the magnetic field in the first and second directions at a location.

9. The apparatus of claim 7 in which the first and second directions comprise a first direction perpendicular to the path and a second direction perpendicular to the path.

10. The apparatus of claim 1, further comprising a storage device to store information about a correlation between a direction of the magnetic field and a position of the armature along the path.

11. The apparatus of claim 1, further comprising a module for calculating a correlation between a direction of the magnetic field and a position of the armature along the path.

12. An active suspension system comprising:
an armature of a linear motor comprising a series of magnets generating a magnetic field and defining a path having a first end and a second end, wherein the series of magnets comprises a first end magnet located at the first end;
a stator of the linear motor comprising coils to interact with the magnetic field generated by the series of magnets of the armature to move the armature relative to the stator along the path;
a plurality of sensors located at fixed positions relative to the stator to sense at least a portion of the magnetic field that is generated by the first end magnet of the series of magnets to determine an absolute position of the armature relative to the stator throughout movement of the armature along the path between the first end and the second end; and
a controller to control the linear motor based on the position of the armature.

13. The active suspension system of claim 12 in which the armature is coupled to a seat.

14. The active suspension system of claim 12 in which the armature is coupled to a wheel.

15. A method comprising:
employing an interaction between coils of a stator of a linear motor with a magnetic field generated by a series of magnets of an armature of the linear motor to move the armature relative to the stator along a path defined by the series of magnets, wherein the path has a first end and a second end, and wherein the series of magnets comprises a first end magnet located at the first end; and
employing a plurality of sensors located at fixed positions relative to the stator to sense at least a portion of the magnetic field that is generated by the first end magnet of the series of magnets to determine an absolute position of the armature relative to the stator throughout movement of the armature along the path between the first end and the second end.

16. The method of claim 15, further comprising determining a direction of the magnetic field.

17. The method of claim 16 in which determining the direction of the magnetic field comprises determining a ratio of a first measurement of the magnetic field in a first direction and a second measurement of the magnetic field in a second direction.

18. The method of claim 17 in which the first and second directions comprise a first direction perpendicular to the path and a second direction perpendicular to the path.

19. The method of claim 15, further comprising positioning a magnetic sensor at a distance from the stator, the distance selected to reduce an interference from a another magnetic field that is generated by the stator.

20. The method of claim 15, further comprising storing in a storage information about a correlation between a direction of the magnetic field and a position of the armature along the path.

21. The method of claim 15, further comprising determining a correlation between a direction of the magnetic field and a position of the armature along the path.

22. An apparatus comprising:
an armature of a linear motor comprising a series of magnets generating a magnetic field and defining a path having a first end and a second end, wherein the series of magnets comprises a first end magnet located at the first end;
a stator of the linear motor comprising coils to interact with the magnetic field generated by the series of magnets of the armature to move the armature relative to the stator along the path; and
a first plurality of sensors to measure the magnetic field generated by the series of magnets of the armature to provide a low resolution measurement of the absolute position of the armature with respect to the stator,
a second plurality of field direction sensors to measure the magnetic field generated by the series of magnets of the armature to provide a high resolution measurement of the relative position of the armature with respect to the stator, and a processor to combine the low resolution measurement of absolute position of the armature with respect to the stator with the high resolution measurement of relative position of the armature with respect to the stator, to form a high resolution measurement of the absolute position of the armature with respect to the stator.

23. The apparatus of claim 22, wherein the field direction sensors measure the angle of a direction of the magnetic field generated by the series of armature magnets relative to a reference direction.

* * * * *